(12) United States Patent
van Seeters et al.

(10) Patent No.: US 12,298,439 B2
(45) Date of Patent: May 13, 2025

(54) DETECTION SYSTEMS, COMMUNICATIONS SYSTEMS AND INDUCTION MOTORS

(71) Applicants: Josephus M. van Seeters, Hamilton, VA (US); Jacobus M. Berkhout, San Rafael, CA (US)

(72) Inventors: Josephus M. van Seeters, Hamilton, VA (US); Jacobus M. Berkhout, San Rafael, CA (US)

( * ) Notice: Subject to any disclaimer, the term of this patent is extended or adjusted under 35 U.S.C. 154(b) by 1006 days.

(21) Appl. No.: 17/270,038

(22) PCT Filed: Aug. 22, 2019

(86) PCT No.: PCT/US2019/047671
§ 371 (c)(1),
(2) Date: Feb. 22, 2021

(87) PCT Pub. No.: WO2020/041573
PCT Pub. Date: Feb. 27, 2020

(65) Prior Publication Data
US 2021/0349189 A1    Nov. 11, 2021

Related U.S. Application Data

(60) Provisional application No. 62/721,513, filed on Aug. 22, 2018, provisional application No. 62/721,518, (Continued)

(51) Int. Cl.
*G01S 7/00*    (2006.01)
*G01S 7/481*   (2006.01)
*G01S 17/89*   (2020.01)
*H02K 11/00*   (2016.01)
*H02K 11/33*   (2016.01)
*G01S 17/931*  (2020.01)
*G01S 17/933*  (2020.01)

(52) U.S. Cl.
CPC .......... *G01S 7/4817* (2013.01); *G01S 7/4813* (2013.01); *G01S 17/89* (2013.01); *H02K 11/0094* (2013.01); *H02K 11/33* (2016.01); *G01S 17/931* (2020.01); *G01S 17/933* (2013.01)

(58) Field of Classification Search
USPC ....................................................... 356/5.01
See application file for complete search history.

(56) References Cited

U.S. PATENT DOCUMENTS 9,091,535 B2 * 7/2015 Baeg ................. G01S 17/89
11,480,657 B2 * 10/2022 Wang ................ H01F 38/14
(Continued)

FOREIGN PATENT DOCUMENTS

EP    2863176 A2 *   4/2015  ............. G01C 15/00

OTHER PUBLICATIONS

Schafter—Kirchhoff: "Laser line, Micro Focus, Macro Focus, and Laser Pattern Generators" (138 pages) (Year: 2019).*

*Primary Examiner* — James R Hulka
(74) *Attorney, Agent, or Firm* — Ahmann Kloke LLP (57) ABSTRACT

A lidar method and apparatus which makes use of two or more novel laser beams, each of the beams being wide in a first plane and narrow in a plane at right angles to the first plane. A novel communication system that can be used in the apparatus. A novel induction motor that can be used in the apparatus.

10 Claims, 8 Drawing Sheets

Related U.S. Application Data filed on Aug. 22, 2018, provisional application No. 62/721,527, filed on Aug. 22, 2018.

(56) References Cited

U.S. PATENT DOCUMENTS

| | | | |
|---|---|---|---|
| 2010/0007870 A1* | 1/2010 | Haberer | G01S 7/4972 |
| | | | 356/5.01 |
| 2014/0111812 A1* | 4/2014 | Baeg | G01S 17/87 |
| | | | 356/610 |
| 2017/0137236 A1* | 5/2017 | Sonoura | B65G 61/00 |
| 2019/0025411 A1* | 1/2019 | Kuroda | G01B 11/25 |
| 2019/0227403 A1* | 7/2019 | Shin | G02B 26/106 |
| 2019/0243023 A1* | 8/2019 | Steinkogler | G01S 7/4817 |
| 2019/0317192 A1* | 10/2019 | Wang | G01S 7/003 |

* cited by examiner

DETECTION SYSTEMS, COMMUNICATIONS SYSTEMS AND INDUCTION MOTORS

RELATED APPLICATIONS

This application is an application under 35 USC 371 based on PCT/US 2019/047671 filed 22 Aug. 2019, and claims priority from that application. This application also claims priority from (1) U.S. provisional application 62/721,513, filed Aug. 22, 2018, by Josephus M. van Seeters and Jacobus M. Berkhout, (2) U.S. provisional application 62/721,518, filed Aug. 22, 2018, by Josephus M. van Seeters and Jacobus M. Berkhout, and (3) U.S. provisional application 62/721,527, filed Aug. 22, 2018, by Josephus M. van Seeters and Jacobus M. Berkhout. The entire contents of each of those provisional applications is incorporated herein by reference for all purposes.

FIELD OF THE INVENTION

This invention relates to (1) in its first aspect, novel laser beams, and detection methods and apparatus using the novel laser beams, (2) in its second aspect, communications systems which are particularly, but not exclusively, useful in the methods and apparatus of the first aspect, and (3) in its third aspect, induction motors which are particularly, but not exclusively, useful in the methods and apparatus of the first aspect and/or in the communications systems of the second aspect.

INTRODUCTION TO THE INVENTIONS

The use of laser beams in systems for detecting the presence of objects is disclosed for example in U.S. Pat. No. 7,969,558 (Hall), U.S. Pat. No. 8,767,190 (Hall), US Patent Application 2010/0020306 (Hall) and US Patent Application Publication 2015/0062555 (Kim). The entire contents of each of those patents and patent publications is incorporated herein by reference.

DETAILED DESCRIPTION OF THE INVENTIONS

In the description of the inventions below, in the Statements below, in the claims below, and in the accompanying Figures and the description of the Figures, reference is made to particular features of different aspects of the inventions. These features can for example be components, ingredients, elements, devices, apparatus, systems, groups, ranges, method steps, test results and instructions, including program instructions.

It is to be understood that the disclosure of the inventions in this specification includes all possible combinations of such particular features. For example, where a particular feature is disclosed in the context of a particular aspect or embodiment of any one of the inventions, or in a particular claim, or in a particular Figure, that feature can also be used in combination with and/or in the context of other particular aspects, embodiments, claims and Figures, and in the inventions generally, except where the context excludes that possibility.

The inventions disclosed herein, and claimed in the claims, include embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components.

The term "consisting essentially of" and grammatical equivalents thereof is used herein to mean that, in addition to the features specifically identified, other features may be present which do not materially alter the claimed invention.

The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%.

The term "at least one of . . . two or more named components" is used herein to denote a single one of the named components or any combination of two or more of the named components.

The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)-(a second number)", this means a range whose lower limit is the first number and whose upper limit is the second number. For example, "from 8 to 20 carbon atoms" or "8-20 carbon atoms" means a range whose lower limit is 8 carbon atoms, and whose upper limit is 20 carbon atoms. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps, except where the context excludes that possibility.

Where reference is made herein to "first" and "second" features, this is generally done for identification purposes; unless the context requires otherwise, the first and second features can be the same or different, and reference to a first feature does not mean that a second feature is necessarily present (though it may be present).

Where reference is made herein to "a" or "an" feature, this includes the possibility that there are two or more such features (except where the context excludes that possibility). Thus, there may be a single such feature or a plurality of such features. Where reference is made herein to two or more features, this includes the possibility that the two or more features are replaced by a lesser number or greater number of features which provide the same function, except where the context excludes that possibility.

The numbers given herein should be construed with the latitude appropriate to their context and expression; for example, each number is subject to variation which depends on the accuracy with which it can be measured by methods conventionally used by those skilled in the art at the date of filing of this specification.

The term "and/or" is used herein to mean the presence of the possibilities stated before and after "and/or". The possibilities can for example be components, ingredients, elements, devices, apparatus, systems, groups, ranges and steps) is present. For example
(i) "item A and/or item B" discloses three possibilities, namely (1) only item A is present, (2) only item B is present, and (3) both item A and item B are present, and
(ii) "item A and/or item B and/or item C" discloses seven possibilities, namely (1) only item A is present, (2) only item B is present, (3) only item C is present, (4) both item A and item B are present, but item C is not present, (5) both item A and item C are present, but item B is not present, (6) both item B and item C are present, but item A is not present, and (7) all of item A, item B and item C are present.

Where this specification refers to a component "selected from the group consisting of . . . two or more specified sub-components", the selected component can be a single one of the specified sub-components or a mixture of two or more of the specified sub-components.

If any element in a claim of this specification is considered to be, under the provisions of 35 USC 112, an element in a claim for a combination which is expressed as a means or step for performing a specified function without the recital in the claim of structure, material, or acts in support thereof, and is, therefore, construed to cover the corresponding structure, material, or acts described in the specification and equivalents thereof, then the corresponding structure, material, or acts in question include not only the corresponding structure, material, or acts explicitly described in the specification and the equivalents of such structure, material, or acts, but also such structure, material, or acts described in the US patent documents incorporated by reference herein and the equivalents of such structure, material, or acts. Similarly, if any element (although not specifically using the term "means") in a claim of this application is correctly construed as equivalent to the term means or step for performing a specified function without the recital in the claim of structure, material, or acts in support thereof, then the corresponding structure, material, or acts in question include not only the corresponding structure, material, or acts explicitly described in the specification and the equivalents of such structure, material, or acts, but also such structure, material, or acts described in the US patent documents incorporated by reference herein and the equivalents of such structure, material, or acts.

This specification incorporates by reference all documents referred to herein and all documents filed concurrently with this specification or filed previously in connection with this application, including but not limited to such documents which are open to public inspection with this specification.

(1) The First Aspect of the Invention, Including the Novel Laser Beams, and the Detection Methods and Apparatus Making Use of the Novel Laser Beams Conventional laser beams have a circular or elliptical cross-section, and are currently used in a wide variety of so-called LIDAR (light imaging, detection, and ranging) systems. We have realized, in accordance with the first aspect of this invention, that improved results can be obtained by using a novel laser beam which is wide in a first plane and relatively narrow in a plane at right angles to the first plane. Such a laser beam is referred to herein as the "novel laser beam" or the "novel LRF" (the term LRF being a well-known abbreviation of a laser beam that is used as a laser range finder).

The width of the novel LRF in the wide plane can for example be 0.05-50°, or 6-50°, or 30-50°, or 35-45°, e.g. about 40°.

The width of the LRF in the narrow plane can for example be 0.1-10.0 mrad, preferably 0.5-2.0 mrad, for example about 1.0 mrad or about 0.5 mrad.

As those skilled in the art will recognize, the novel LRF can be produced by modifying a laser source through the use of one or more suitable lenses, or in any other way.

In this specification, the first aspect of the invention is chiefly described by reference to novel methods of detection making use of one or more "novel LRFs" which rotate around an axis, and novel apparatus suitable for use in such methods. However, the "novel LRF" can be used in other applications.

In one embodiment of the method of the invention, there is a single "novel LRF" and one or more conventional laser beams, each of the laser beams rotating around an axis, preferably the same axis.

In a preferred embodiment of the invention, the method makes use of at least two "novel LRFs" which rotate around the same axis and are separated angularly in the plane at right angles to the axis. In the simplest embodiment, there are only two "novel LRFs", namely a pair of related LRFs made up of (1) a first "novel LRF" and (2) a second "novel LRF". There is an angular separation between the LRFs in the plane at right angles to the axis of rotation; the angle can be 15-180°, preferably about 180°. The first and second "novel LRFs" are set at an angle on opposite sides of the plane including the axis of rotation; the angles are preferably the same but opposite, for example an angle of 15-50°, e.g. about 30°. The two "novel LRFs" can be identical or they can have different first and/or second dimensions, and/or they can have different frequencies. The term "pair of related LRFs" is used herein to denote two LRFs conforming to this definition In other embodiments, there are more than two "novel LRFs" which rotate around the same axis with an angular separation between the different LRFs in a plane at right angles to the axis of rotation. The novel LRFs can be identical or they can have different first and/or second dimensions, and/or they can have different frequencies. The angular separation of the LRFs around the axis of rotation can be regular or irregular. Preferably each of the LRFs is set at an angle to the plane including the axis of rotation; the angles are preferably the same, for example 15-50°, e.g. about 30°, but can be different. The LRFs can be the same or different, for example can differ in wavelength. In one embodiment, there is (1) a first "pair of related LRFs" as defined above with an angular separation of about 180° between the two LRFs in the plane at right angles to the axis of rotation and (2) a second "pair of related LRFs" as defined above with an angular separation of about 180° between the two LRFs in the plane at right angles to the axis of rotation, with an angular separation of about 90° the first and second pairs. The wavelengths of the first and second pairs can be different in order to increase the sensitivity of the system, particularly in unfavorable weather conditions such as fog, rain or snow The invention can make use of one or more conventional LRFs which rotate around the same axis as the "novel LRFs". The conventional LRFs can be the same or different, for example can differ in wavelength from each other and/or from the wavelength of the "novel LRFs".

The laser beams identified in this specification are often referred to as LRFs (laser range finders). Each LRF rotates around an axis and is interrupted when it encounters an object to be detected. The change in the laser beam, when it encounters an object, can be collected as data and used to identify one or more characteristics of the object. The data can for example be subject to an IMU (inertial measurement unit) sensor and/or an AHRS (attitude and heading reference system) sensor, for example with the aim of eliminating vehicle movement from range measurements and establishing an artificial horizon that can be used for the correlation calculations of the LRFs. Using a pair of the novel laser beams, and an encoder to track the horizontal angle, a computer can calculate the vertical position of a detected object.

One embodiment of the apparatus of the first aspect of the invention comprises a rotatable hub and, mounted on the hub, two laser sources, each of which can generate a "novel LRF". There is an angular separation between the two "novel LRFs", in the plane at right angles to the axis. The angular separation can for example be 15-180°, for example 180°. Preferably, the "novel LRFs" are set at different angles to the plane which includes the axis, the angle preferably being at the same but opposite angles to the plane which includes the axis of rotation. For example, one of the "novel LRFs" is set at a positive angle to the plane including the axis of rotation, for example an angle of 20-45°, e.g. 30°, and the other "novel LRF" is set at an opposite angle, preferably the same angle, to the axis. The hub can include a receiver with a similar field of view.

The hub can include a computer to analyze the collected data and/or can be connected to a separate computer to analyze the collected data. The apparatus can be mounted on a mobile base, for example on a road vehicle or an aerial vehicle (e.g. a drone), for example on the top of an automobile or underneath a drone; or the apparatus can be mounted on a fixed base, for example on the ceiling or on a wall of a room for surveillance purposes.

The invention can, but preferably does not, make use of mirrors and/or prisms.

In some embodiments of the method of the first aspect of the invention there is a horizontal field of view up to 360°, a vertical field of view which is determined by the location of the hub on its base, for example up to 30° when the hub is mounted on the top of a car, or up to 180° in other cases.

In some embodiments, the "novel LRFs", or the pair or pairs of related "novel LRFs", and any additional laser beams, rotate around a fixed vertical axis. However, other arrangements are possible. For example, the rotation can be around a fixed horizontal axis, or around a fixed non-horizontal or non-vertical axis, or around an axis that changes with time or in response to an operator of the apparatus or in response to external events or information gathered by the laser beams. Elsewhere in this specification, the references to horizontal and vertical relate to LRFs that rotate around a vertical axis.

In the pair (or if there is more than one pair, in each pair) of related "novel LRFs" as defined, the speed of rotation around the axis and the spacing of the related laser beams in the plane at right angles to the axis are preferably such that second LRF follows the first LRF closely, so that there is only a short interval, for example 0.1-0.01 second, between the interruption of the "novel LRFs", as each encounters the object to be detected.

The "novel LRF" is preferably set at an angle to the plane including the axis around which the "novel LRF" rotates. The angle can be for example 10-45°, preferably 20-40°, e.g. about 30°. There can be two or more "novel LRFs" which are spaced around, preferably at regular intervals around, a plane at right angles to the axis about which they rotate, for example two "novel LRFs" that are mirror images of each other.

In a preferred embodiment of the first aspect of the invention, there are only two "novel LRFs" which rotate about a fixed axis and which are identical except that (1) they are separated by an angular difference, in the plane at right angles to the axis about which the "novel LRFs" rotate, the angular difference being for example about 180° and (2) one of the "novel LRFs" is set at an angle, for example 15-40°, e.g. about 30°, to one side of the plane including the axis of rotation and the other is set at the same angle to the opposite side of the plane including the axis of rotation. In different embodiments, (a) both "novel LRFs" operate continuously, or (b) the "novel LRFs" operate intermittently at predetermined intervals, or (c) one of the "novel LRFs" operates continuously, and the second "novel LRF" operates only when the first "novel LRF" detects an obstacle. The operation of the "novel LRFs" can be set by a predetermined schedule, or can be determined by exterior circumstances, or by the user of the apparatus.

The rate at which the "novel LRFs" and any additional LRFs rotate around the axis is generally between 1 and 50 or 10-50, for example 20-40 Hz or 10-30 Hz. The rate can be fixed or can vary, for example in response to information gathered by the LRFs.

In one embodiment of the first aspect of the invention, the method creates an image, preferably a 3D digital image of the physical environment, using one or two or more pairs of related "novel LRFs" as defined above. The "novel LRFs" rotate around an axis which is part of an apparatus that can generate the LRFs. The LRFs are oriented in known angles to each other in a plane at right angles to the axis of rotation, and in known angles to a plane which includes the axis of rotation. A high resolution horizontal encoder can be used to determine the horizontal angle between detections of the same object by the different LRFs, so that the objects with the same distance detected by the LRFs can be used in computer calculations to determine the vertical angle of the objects in a 3D digital image. The strength of the reflected signal of objects at the same distance can be utilized by computer calculations to increase the accuracy of the vertical angle and/or to determine a characteristic of the object detected.

The rotation, and the angular separation of "novel LRFs" in the plane at right angles to the axis of rotation, is preferably such that there is only a short interval, for example 0.1-0.01 second, between the interruption of the LRFs, as each encounters the object to be detected.

Preferably the wide dimension of each of the "novel LRFs" is at an angle to the plane which includes the axis around which the "novel LRFs" rotate. The angle can be for example 10-45°, preferably 20-40°, e.g. about 30°. The angles are different so that adjacent LRFs provide different information about an object encountered by the LRFs. For example, if there is only a pair of LRFs, they can be set at the same but opposite angle to the plane which includes the axis around which they rotate.

There can be two or more "novel LRFs" which are spaced around, preferably at regular intervals to each other in the plane at right angles to the axis about which they rotate, for example one or more pairs of "novel LRFs" that are mirror images of each other. The "novel LRFs" can be identical, or they can differ in one or more respects; for example, they can differ in wavelength in order to increase sensitivity of the system to detect objects and/or to detect objects in unfavorable weather conditions, such as fog, rain, snow.

In one embodiment of the first aspect of the invention, there are only two "novel LRFs" which rotate about a fixed axis and which are identical except that (1) they are separated by a horizontal angular difference, e.g. of 180°, in the plane at right angles to the axis about which they rotate, and (2) one is set at an angle, e.g. 10-40° or about 30°, to the plane which includes the axis of rotation and the other is set at the same angle on the opposite side of the axis of rotation. In different embodiments, (a) both "novel LRFs" operate continuously, or (b) the "novel LRFs" operate intermittently at predetermined intervals, or (c) one of the "novel LRFs" operates continuously, and the second "novel LRF" operates only when the first "novel LRF" detects an obstacle. The operation of the "novel LRFs" can be set by a predetermined schedule, or can be determined by exterior circumstances, or by the user of the apparatus.

A preferred embodiment of the first aspect of the invention is an apparatus and method for creating an image, preferably a 3D digital image of the physical environment around the apparatus, using two or more rotating "novel LRFs". The LRFs are oriented in known, different angles to (1) the plane including the axis of rotation and (2) the plane including the vertical axis of rotation. A high resolution horizontal encoder can be used to determine the horizontal angle between detections of the different rotating laser range finders. Objects with the same distance detected by the laser range finders can be used in computer calculations to determine the vertical angle of the objects in a 3D digital image. The strength of the reflected signal of objects at the same distance can be utilized by computer calculations to increase the accuracy of the vertical angle and/or to determine a characteristic of the object detected.

The first aspect of the invention is illustrated in FIGS. 1-13 of the accompanying drawings, which are diagrammatic illustrations of an exemplary embodiment of the first aspect of the invention, and are not to scale. Note that the LRFs extend much further than is depicted in any of Figures.

Figure 1:
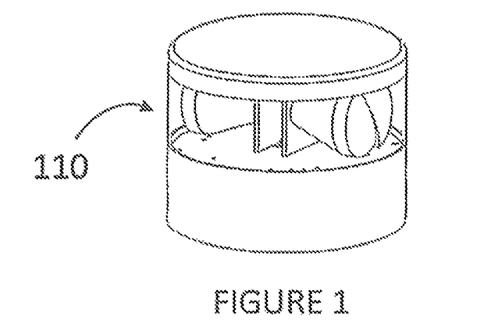
FIG. 1 illustrates a rotatable hub according to some embodiments.

FIG. 1 illustrates a rotatable hub 110 which includes (1) two LRF sources, each of which can generate a "novel LRF", and (2) a receiver with a similar field of view, thus making it possible to generate data collected by the LRFs to produce a 3D-computer image.

Figure 2:
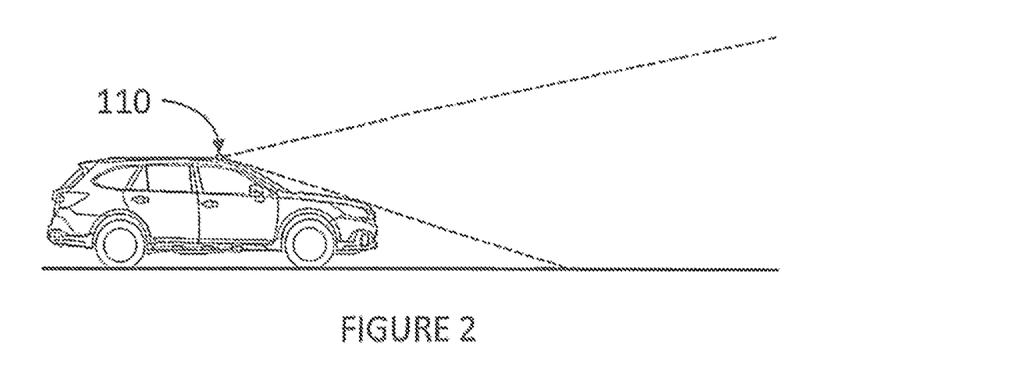
FIG. 2 illustrates a car having a rotatable hub according to some embodiments.

FIG. 2 shows a car having a rotatable hub of the kind shown in FIG. 1 mounted on top of the car. The LRFs are shown as extending in front of the vehicle. However, when the method is in progress, the LRFs rotate around the axis in the hub, and sweep all around the vehicle.

Figure 3:
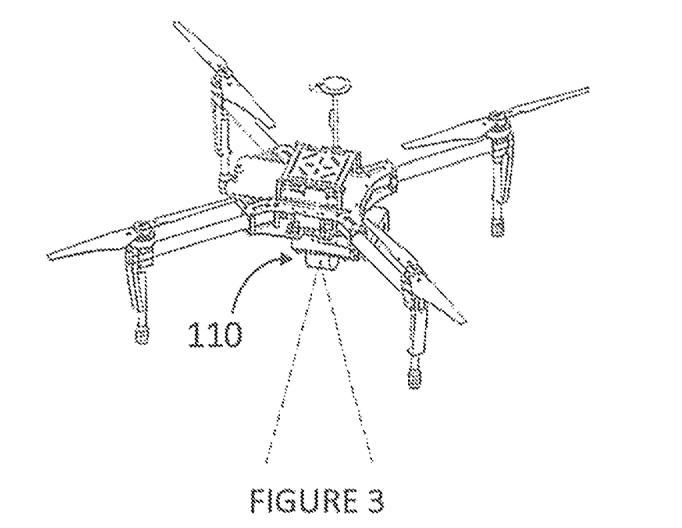
FIG. 3 illustrates an unmanned aerial vehicle having a rotatable hub according to some embodiments.

FIG. 3 shows an unmanned aerial vehicle having a rotatable hub similar to that shown in FIG. 1 mounted underneath it.

Figure 4A:
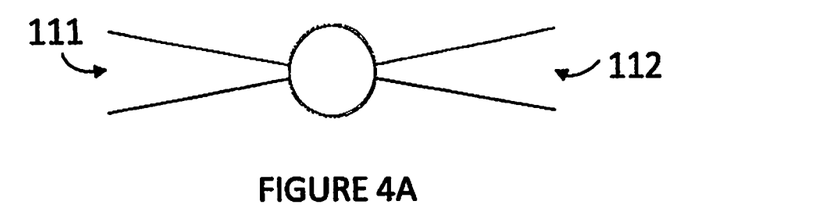
FIG. 4a illustrates a top view of the hub according to some embodiments.
Figure 4B:
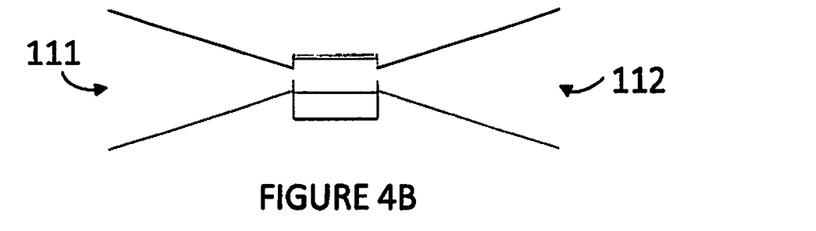
FIG. 4b illustrates a side view of the hub according to some embodiments.

FIGS. 4a and 4b are top and side views of the hub and the first and second "novel LRFs" 111 and 112 generated by the laser sources at a moment during the rotation when both the LRFs are completely in view.

Figure 5A:
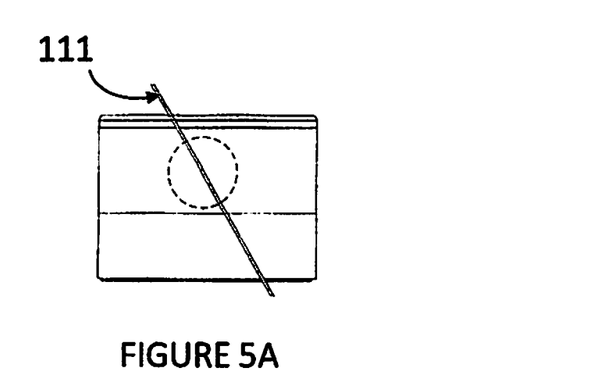
FIG. 5a illustrates a side view of the hub according to some embodiments.
Figure 5B:
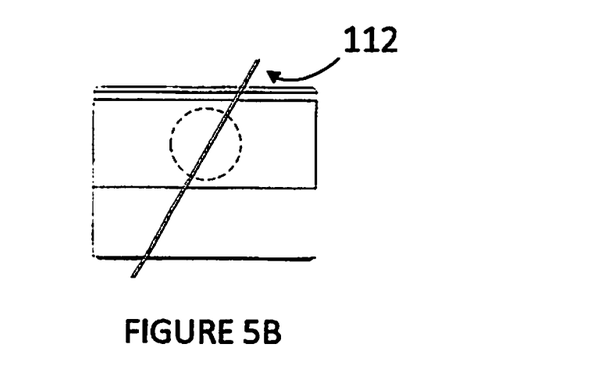
FIG. 5b illustrates another side view of the hub according to some embodiments.

FIG. 5A is a side view, and FIG. 5B is an opposite side view of the hub and the "novel LRFs" 111 and 112, at a moment during the rotation when both the LRFs extend directly into the side view, showing the different orientations of the LRFs.

Figure 6:
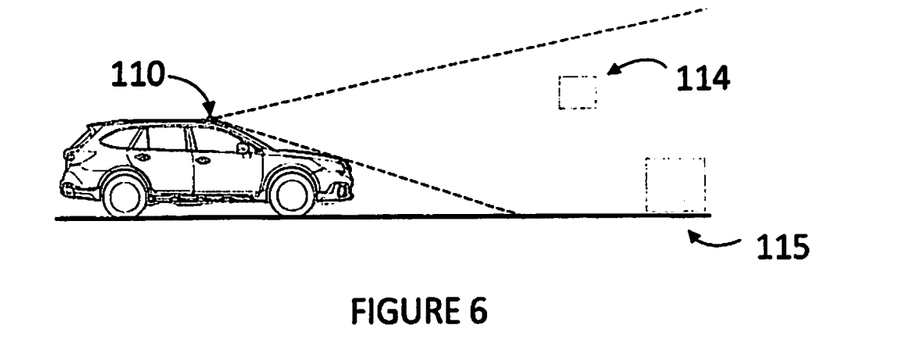
FIG. 6 illustrates a side view of a vehicle with a hub mounted on top of the vehicle according to some embodiments.

FIG. 6 is a side view of a vehicle having a hub 110 mounted on the top of a vehicle and one of the LRFs extending in front of the vehicle onto a road on which there are objects 114 and 115.

Figure 7:
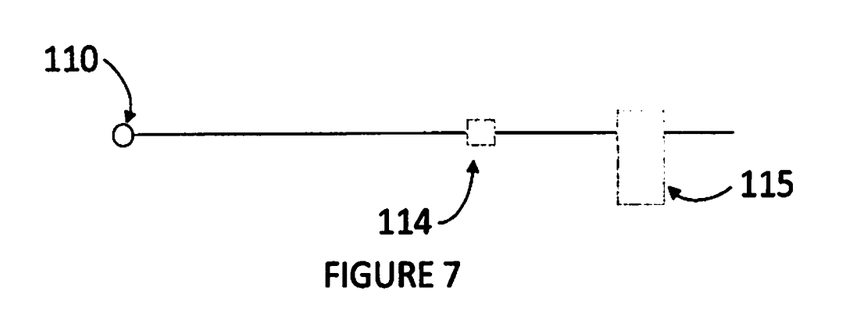
FIG. 7 illustrates a top view of the hub according to some embodiments.

FIG. 7 depicts a simplified top view with the hub 110 and object 114 and object 115.

Figure 8:
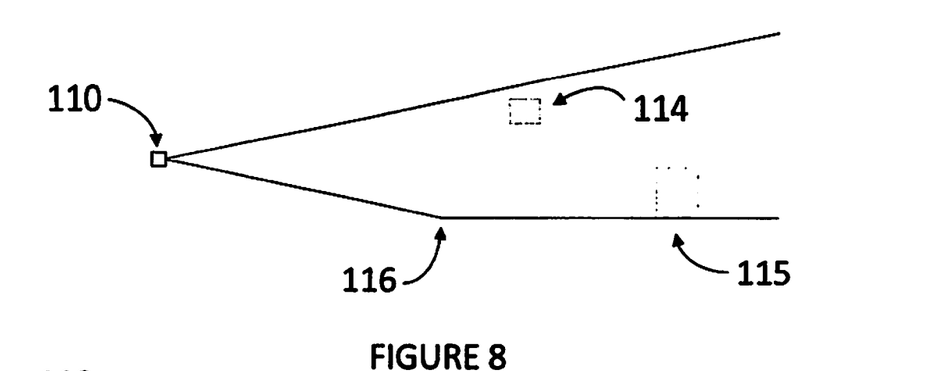
FIG. 8 illustrates a side view of the hub according to some embodiments.

FIG. 8 depicts a simplified side view in which the road 116 is added. In FIG. 7, the diagram shows the measurements of LRF 111 right in front of the vehicle, when it detects the road 116, object 114 and object 115. For each individual detection, the signal strength and distance are measured and recorded. When the hub 113 has sufficiently rotated, LRF 112 will measure the same distances when it detects the road 116, object 114 and object 115. The signal strengths of the detected object can be utilized to decrease the false alarm rate and increase accuracy. A high resolution horizontal encoder records the horizontal angle of all LRF measurements. By means of the 180-degree horizontal angular location difference between the two LRFs, the vertical angle can be calculated.

FIGS. 7 and 8 are simplified top and side views of FIG. 6, FIG. 8 including a road 116. FIG. 7 shows the measurements of the LRF 111 right in front of the vehicle, when it detects the road 116, object 114 and object 115. For each individual detection, the signal strength and distance are measured and recorded. When the hub has rotated through 180°, the LRF 112 will measure the same distances when it detects the road 116, object 114 and object 115. The signal strengths of the detected object can be utilized to decrease the false alarm rate and increase accuracy. A high resolution horizontal encoder records the horizontal angle of all LRF measurements. Because there is a 180° horizontal angular difference between the two LRFs, the vertical angle can be calculated.

Figure 9:
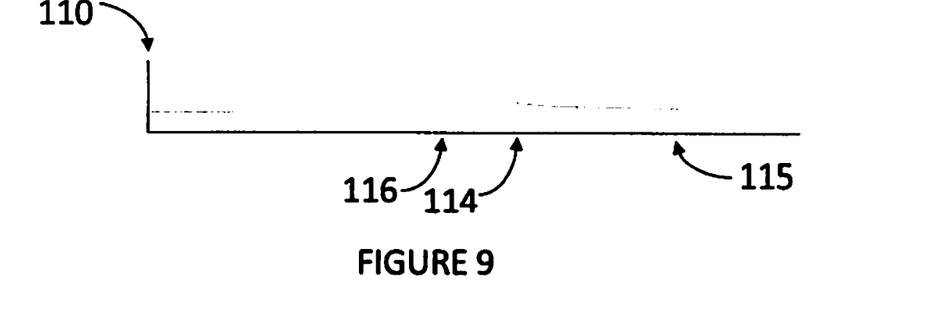
FIG. 9 illustrates the strength of the signal received on the vertical ordinate according to some embodiments.

FIG. 9 shows on the vertical ordinate the strength of the signal received by the first LRF from the road 116, the object 114, and the object 115, and, on the horizontal ordinate, the timeline of the received signal.

Figure 10:
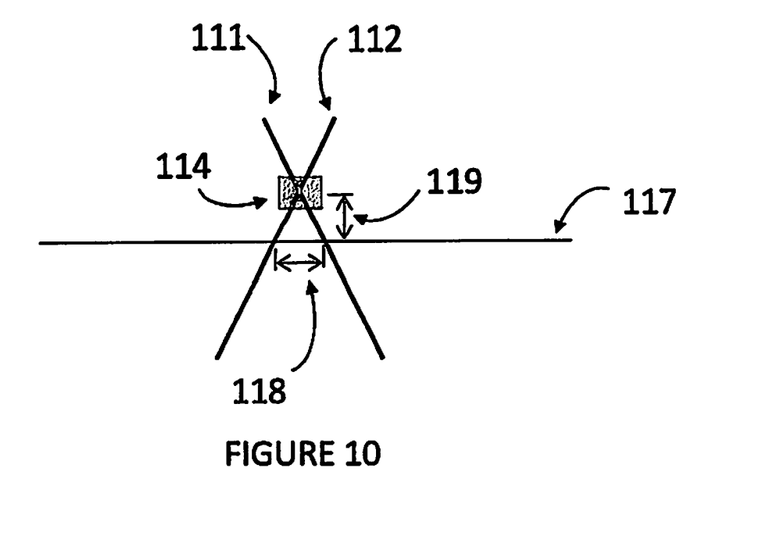
FIG. 10 illustrates the calculation of the vertical angle based on the relative horizontal angle difference.

FIG. 10 is a schematic image which explains the calculation of the vertical angle 119 based on the relative horizontal angle difference 118 between the signals reported by first and second LRFs 111 and 112, and depicts the horizontal plane 117 of a horizontal encoder.

Figure 11:
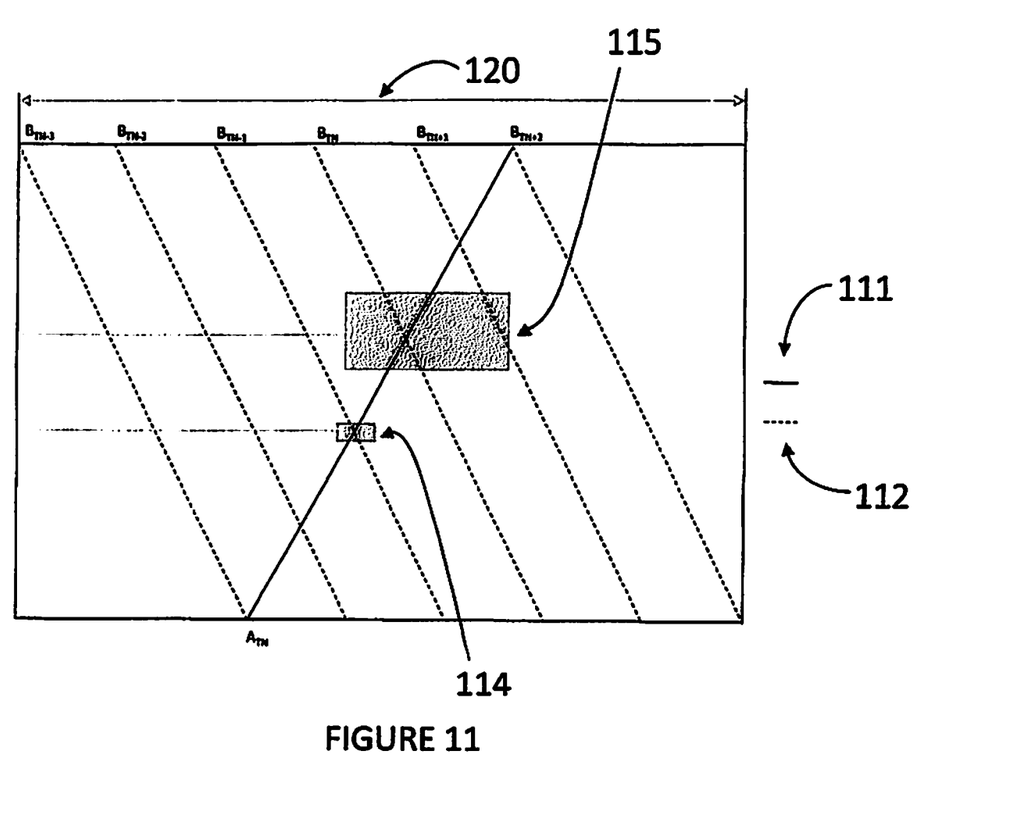
FIG. 11 illustrates measurements from two laser range finders.

FIG. 11 compares the measurements from LRF 111 and from LRF 112 in the horizontal overlapping area 120 of both LRFs, based on the opposite 30° angles of the LRFs relative to the vertical plane. This type of measurement can be expanded to include any practical number of "novel LRFs", wherein each LRF covers the full or a portion, overlapping to a certain extent, of the desired vertical angular range.

Figure 12:
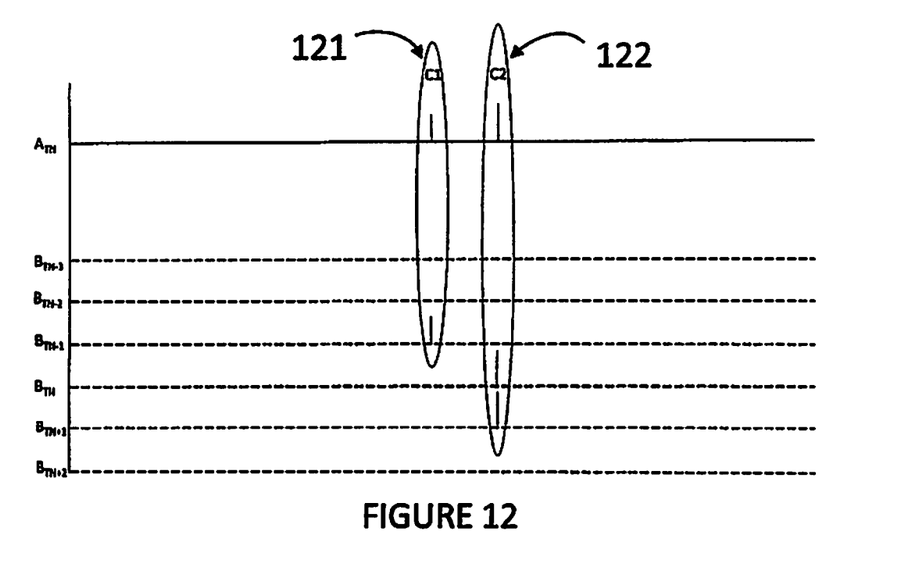
FIG. 12 illustrates a received signal strength and time scale graph of measurements reported by two laser ranger finders.

FIG. 12 depicts one measurement $A_{tN}$, of LRF 111 being compared with six measurements $B_{Tn-3}$ through $B_{Tn+2}$ of LRF 112 in the horizontal overlapping area of the in two LRFs, where both LRFs detect objects 114 and 115. The areas C1 121 and C2 122 in the "Received Signal Strength" graphic image identify the identical measurements obtained at $A_{Tn}$, $B_{Tn-2}$, $B_{Tn}$ and $B_{Tn-2}$ from objects 114 and 115. C1 and C2 denote the same distances measured by LRF 111 and LRF 112. FIG. 12 shows on the vertical ordinate the received signal strength and on the horizontal ordinate the time scale, representing distance, and thus depicts one measurement A reported by the first LRF for the objects 114 and 115 as compared to six measurements B reported by the second LRF for the objects 114 and 115.

Multiple range values at different locations on the object within C2 measurements $B_{Tn}$ and $B_{Tn+1}$ result in different vertical angles for the same object, making it possible to determine at least one of the width and the height of the object.

Figure 13:
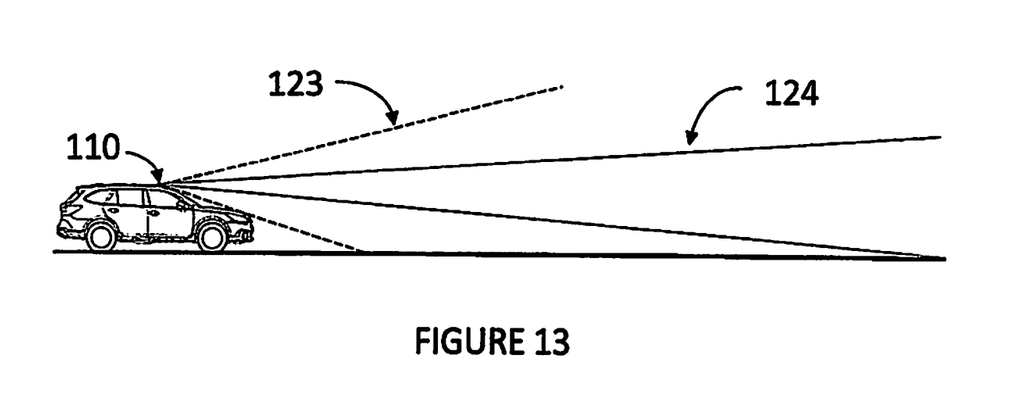
FIG. 13 illustrates a side view of a vehicle having a hub mounted on top according to some embodiments.

FIG. 13 is a side view of a vehicle having a hub 110 mounted on top of the vehicle and shows first and second novel LRFs 123 and 124, which have different second dimensions.

In other systems similar to that shown in FIGS. 1-13, there can be one or more additional LRFs, which may be but need not be novel LRFs, which rotate around the same axis, optionally operating at other wavelengths, in order to improve the detection probability and the false alarm rate in different weather conditions. In one embodiment, there is an additional "pair of novel LRFs as defined above.

In the system shown in the FIGS. 1-13, two "novel LRFs" are emitted from a rotating platform 110. There is substantially 180° of angular separation between the two LRFs in the plane at right angles to the axis of rotation, and the LRFs are set at opposite angles relative to the plane including the axis of rotation, the angle preferably being the same and being for example 15-45°, e.g. about 30°. Because the "novel LRFs" have a wide dimension (and a comparatively narrow dimension), each can detect many objects (if necessary, simultaneously), but the vertical angles of the objects cannot be determined by a single one of the LRFs. However, the vertical angle of the detected object can be determined by comparing the input from the different "novel LRFs" because the LRFs are set at opposite angles relative to the plane including the axis of rotation, the angle being for example 15-45°, e.g. about 30°.

Multiple range values at different locations on the object within C2 measurements BTS and $B_{Tn+1}$ result in different vertical angles for the same object, making it possible to determine at least one of the width and height of the object.

The following Statements provide further definitions of particular embodiments of the first aspect of the invention.

Statement #1.

A method of detection, preferably a lidar system and technique for creating a 3D digital image of the physical environment around the system, using two or more rotating laser range finders (LRFs). The laser range finders are novel LRFs which project a line shaped beam which is wide in a first plane and narrow in a second plane at right angles to the first plane. Depending upon the application, the LRF may be horizontally narrow and vertically wide or vertically narrow and horizontally wide, or may be narrow in a first non-horizontal plane or non-vertical plane and wide in a different plane at right angles to the first plane. The LRFs rotate around an axis of rotation and are oriented at known, different angles to the plane including the axis of rotation. A horizontal encoder of sufficiently high resolution can be used to determine the horizontal angle between objects detected by the novel LRFs. Objects with the same distance detected by the LRFs can be used in computer calculations to determine the vertical angle of the objects in the 3D digital image. The strength of the reflected signal of objects at the same distance can be utilized by computer calculations to increase the accuracy of the vertical angle.

Statement #1A.

A method according to Statement #1 wherein one or more additional LRFs rotate around the same axis and increase the system's reliability.

Statement #1B.

A method according to Statement #1 or Statement #1A wherein additional LRFs with different wavelengths rotate around the same axis and increase the sensitivity of the system to detect objects and/or its capability to detect objects in unfavorable weather conditions such as fog, rain, snow, smoke etc.

Statement #1C.

A method according to Statement #1 or Statement #1A or Statement #1B which provides a horizontal field of view up to 360°, a vertical field of view of up to 180°, but in some cases, according to the application, only up to 30°, and an angular resolution as required by the application.

Statement #2.

A method that generates data for a 3D-computer image and which includes a stationary element with protective housing and attachment features, a motor to rotate a subassembly with two or more sets of laser emitter and detector placed in a circular pattern, electronic components to provide power to the rotating sub-assembly, and electronic components to communicate data and control signals between the rotating sub-assembly and the stationary element.

Statement #2A

A method according to Statement #2 which includes an induction motor to drive and to provide the rotating subassembly with electrical power.

Statement #2B

A method according to Statement #2 or Statement #2A which includes light emitters and detectors to provide communication between the rotating sub-assembly and the stationary element.

Statement #2C

A method according to Statement #2 or Statement #2A or Statement #2B wherein computer calculation is used to generate data for a 3D-computer image.

Statement #3

A lidar system or method which uses a combination of LRFs, each of which is wide in a first plane and narrow in a second plane at right angles to the first plane, each of the LRFs being at different vertical angles, to detect objects at a specific point in time (range), and allows the determination of an accurate vertical angle of a detected object at any given horizontal position, with a minimum of two emitter and detector sets without vertically beam deflecting elements.

Statement #3A.

A lidar system or method according to Statement #3 which uses a limited number of emitter and detector sets and permits a larger clear receiver aperture and/or lens, increased sensitivity and greater range for a given system size and less energy emitted. A larger receiver aperture and/or lens also provides an opportunity to accumulate multiple received detections.

Statement #3B.

A lidar system or method according to Statement #3 or Statement #3A wherein there are no verticals scans and only horizontal scans, whereby there are a limited number of measurements, for example 3000-1,000,000, e.g. about 3600 measurements, per full rotation, and/or a lower speed of the emitter and detector set, and/or multiple received pulses are accumulated, and/or results in more range with less immediate energy, thus limiting light pollution and "blinding" of a similar lidar system operating at the same laser wavelength.

Statement #3C.

A lidar system or method according to Statement #3 or Statement #3A or Statement #3B wherein multiple range events are digitally accumulated using post processing, enabling the detection of smaller objects and/or detection under adverse weather conditions and/or the use of less emitted energy.

Statement #3D.

A lidar or method according to Statement #3 or Statement #3A or Statement #3B or Statement #3C wherein multiple range events are processed to determine absolute and relative speeds in X, Y and Z directions. For example, the lidar can know the absolute speed of a vehicle on which it is mounted and the relative speeds of the vehicle and another vehicle detected by the lidar, and, therefore, the absolute speed of the vehicle being detected.

Statement #3E.

A lidar system or method according to Statement #3 or Statement #3A or Statement #3B or Statement #3C or Statement #3D, wherein the varying signal strength of the detected target at different times and the different emitter and detector sets is utilized to mitigate the effects of varying visibility conditions.

Statement #3F.

A lidar system or method according to Statement #3 or Statement #3A or Statement #3B or Statement #3C or Statement #3D or Statement #3E, wherein the signal strength of the received signal is used to determine a characteristic of the detected object Statement #3G A lidar system or method according to Statement #3 or Statement #3A or Statement #3B or Statement #3C or Statement #3D or Statement #3E or Statement #3F, wherein LRFs and detectors operating at different wavelengths are used, in order to mitigate the effects of reduced visibility conditions and/or enabling determination of a characteristic of the detected object.

Statement #3H.

A lidar system or method according to Statement #3 or Statement #3A or Statement #3B or Statement #3C or Statement #3D or Statement #3E or Statement #3F or Statement #3G, which includes additional emitter and detector sets operating under different vertical angles and/or different wavelengths, thus increasing system accuracy and/or reliability when operating under adverse weather conditions.

Statement #4.

An assembly which comprises sources for two or more rotating laser range finders (LRFs) each with a narrow horizontal and wide vertical laser beam, an encoder to track the horizontal angle and a computer that calculates the vertical position of detected objects, thus creating data for 3D images.

Statement #4A.

An assembly according to Statement #4 wherein a plurality of LRFs, each placed in a known horizontal angle from each other, and protecting a narrow horizontal and wide vertical beam profile, with opposing vertical angles.

Statement #4B.

An assembly according to Statement #4 or Statement #4A wherein the assembly comprises an induction motor to drive and to provide the rotating sub-assembly with electrical power.

Statement #4C.

An assembly according to Statement #4 or Statement #4A or Statement #4B wherein light emitters and detectors are used to provide communication between the rotating sub-assembly in the stationary element.

Statement #4D.

A lidar method or system according to Statement #4 or Statement #4A or Statement #4B or Statement #4C wherein computer calculation is used to generate data for a 3D-computer image.

Statement #5.

A device capable of detecting distances to objects up to 1 km at a scalable horizontal resolution of up to 0.5 mrad over a 360° or less angular range and a vertical angular range of up to +1-90° with a scalable resolution of up to 0.5 mrad. The device comprises two or more LRFs which rotate about an axis, each of the LRFs being wide in one plane and relatively narrow at right angles to that plane. The beams of the LRFs of are oriented relative to each other in such a way that a high horizontal and vertical resolution can be obtained. The narrow dimension of the LRF can for example be about 0.5 mrad and the broad dimension of the LRF can for example be from −45° to −6° or from +6° to +30°. The beams travel in a circle around a horizontal axis, for example with a frequency of 1-50 Hz, or 20-40 Hz, or 10-30 Hz. The vertical angle and its angular resolution can be obtained from (1) The ability of each LRF to detect a large number of targets in one range event, reflecting its range resolution. At a maximum range capability of 1000 m, the rangefinder will be able to detect 1000 targets (or more if a higher range resolution is desired) in one range event.

(2) The horizontal rotation angle between the targets detected at the same distance by each laser range finder. In one example, a target is detected by the first laser LRF set at a +30° angle to the plane including the axis of rotation and by a second LRF set at a −30° angle to the same plane. The target is detected at 100 m by both LRFs at a rotational angle measured by an angular encoder at 200°. The vertical angle is calculated as 17.32° from the quantity (200.00−180.00)/2/tan (30°).

(2) The Communication Systems, Methods and Assemblies which Provide the Second Aspect of the Invention In its second aspect, this invention provides a light-based, preferably an infra-red (IR) light-based, communication system which is particularly useful for communicating, data at high data rates over short distances. The system is particularly, but not exclusively, useful in the methods and apparatus of the first aspect of the invention. The communication system comprises (1) a first structure comprising a light emitter, preferably an infrared (IR) emitter, (2) a second structure comprising a light detector which can detect light emitted by the light emitter, preferably an IR detector, the distance between the first and second structures being short enough to ensure that the light emitted by the emitter can be detected by the detector, and (3) a component, e.g. a hollow shaft, which connects the first and second structures, the emitter being at one end of the component and the detector being the other end of the component, and the component being such that data transmitted from the emitter to the detector is substantially protected from environmental light interference.

The second aspect of the invention also provides a method of transmitting data which comprises (A) using an emitter to generate data in the form of light waves, (B) passing the light waves through a component which protects the data from environmental light interference, and (C) receiving the light waves in a detector.

The assembly of the second aspect of the invention can lie between a fixed structure and a rotatable structure. The rotatable structure can for example be a hub which comprises one or more laser beam sources and which is part of a lidar assembly, e.g. a lidar apparatus as described in the first aspect of the invention. The fixed structure can for example comprise an induction motor which can rotate the hub, e.g. an induction motor as described below in the third aspect of the invention.

Figure 14:
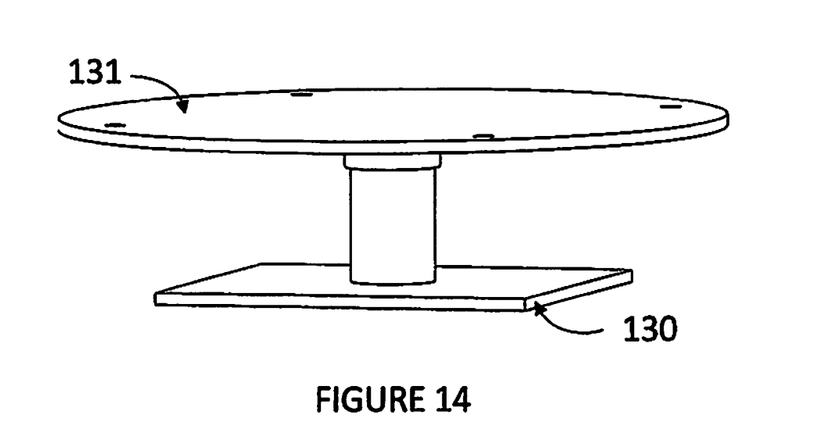
FIG. 14 illustrates a perspective view of an assembly according to some embodiments.
Figure 15:
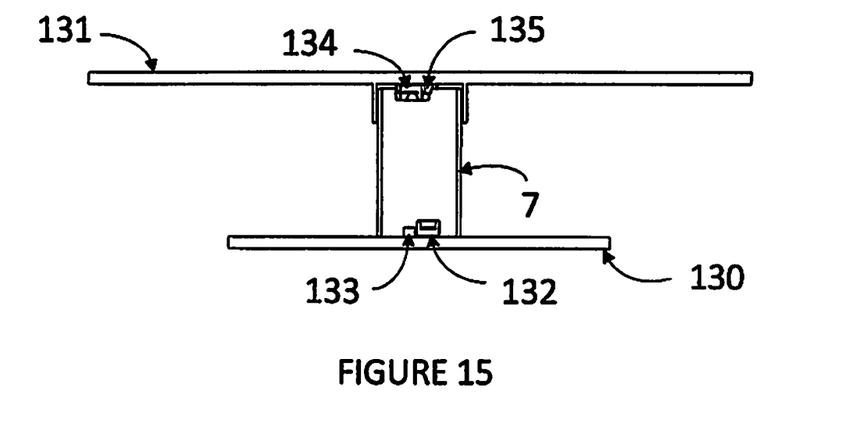
FIG. 15 illustrates a cross-sectional view of the assembly from FIG. 14.

The second aspect of the invention is illustrated in the accompanying drawings in which FIGS. 14 and 15 show an exemplary embodiment of the second aspect of the invention and in which FIG. 14 is a perspective view of an assembly according to the second aspect of the invention, and FIG. 15 is a cross-sectional view of the assembly shown in FIG. 14.

(3) The Third Aspect of the Invention

The third aspect of the invention provides an assembly which comprises a multi-phase induction motor, preferably a three-phase induction motor, comprising (1) a wound rotor, and—(2) a multi-phase rectifier, preferably a three-phase rectifier, which is mounted on the rotor. The assembly preferably comprises electronics, e.g. one or more printed circuit boards, which can be powered by DC output from the three-phase rectifier. The electronics can optionally be mounted on the rotor.

The third aspect of the invention also provides an assembly which comprises (1) an induction motor as defined above, and (2) an assembly which rotates around an axis and which is driven by the induction motor, for example a lidar assembly, e.g. a lidar apparatus as described in the first aspect of the invention.

Figure 16:
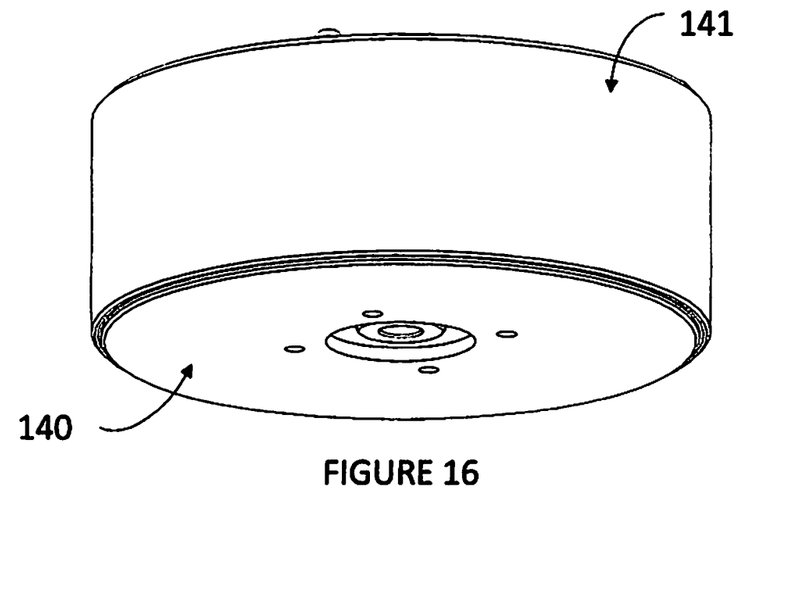
FIG. 16 illustrates a perspective view of an induction motor according to some embodiments.
Figure 17:
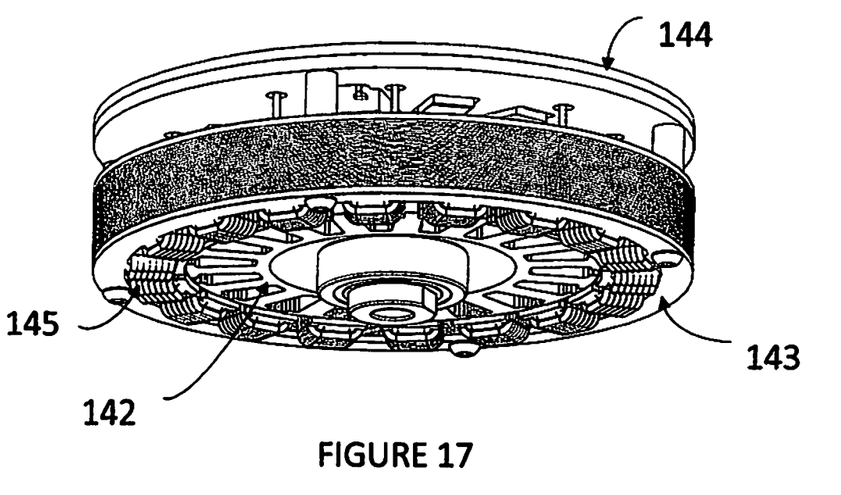
FIG. 17 illustrates another perspective view of the induction motor according to some embodiments.
Figure 18:
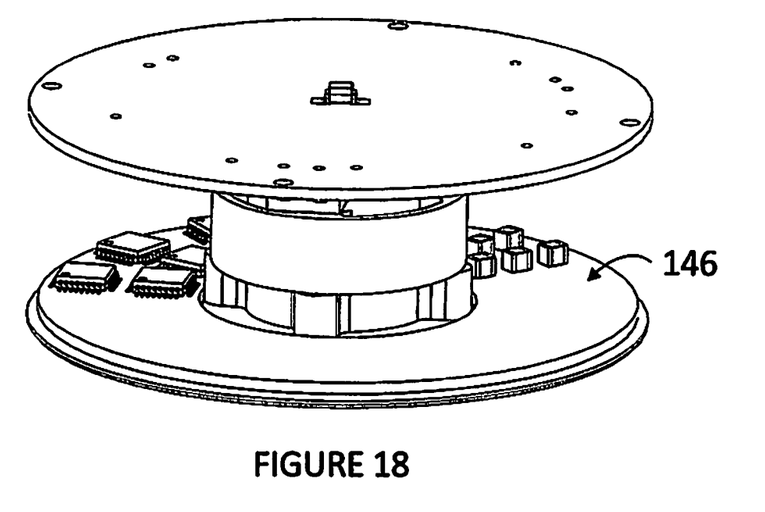
FIG. 18 illustrates a perspective view of the induction motor according to some embodiments.

The third aspect of the invention is illustrated in the accompanying drawings in which FIGS. 16-18 show an exemplary embodiment of the third aspect of the invention and in which FIG. 16 is a perspective view of an induction motor according to the third aspect of the invention, FIG. 17 is a perspective view of the motor shown in FIG. 16 showing additional details, and FIG. 18 is a perspective view of the motor shown in FIG. 16 showing additional details.

FIG. 1 shows a rotatable lidar apparatus that can be used to operate LRFs which can generate data for a 3D-computer image. The lidar uses two LRFs, as shown in FIG. 4a (top view), FIG. 4b (side view) and FIGS. 5a and 5b (end views).

In other systems similar to that shown in FIGS. 1-10, more sets of LRFs could be used to improve the reliability of the system by increasing the detection probability, and/or reducing the false alarm rate and/or increasing the accuracy of LRF measurements; or additional LRFs operating at other wavelengths could be used to improve the detection probability and/or reduce the false alarm rate in different weather conditions.

In the system shown in the FIGS. 1-12, LRFs are placed on a rotating platform with a +180-degree horizontal angle in between. The 180-degree is an example but not a requirement or limitation of this invention. Because of the narrow horizontal and wide vertical laser beam the LRFs can detect many objects simultaneously, but their vertical angles cannot be determined by one only of the LRFs, In order to determine the vertical angle of the detected object or objects, each LRF in this system is placed such that the narrow but wide vertical laser beam emitted from the LRF is, for example but not limited to, at 30° relative to the vertical plane. However, the vertical angles of the two-laser beams are different from each other, in this example opposite from each other. FIG. 5a shows the lidar in front view with the laser beam projection of LRF 111 drawn as a line. FIG. 5b shows the lidar in front view with the laser beam projection of LRF 112 also drawn as a line after half a rotation of the lidar.

FIG. 6 shows an example scenario where the lidar 113 is mounted on top of a vehicle. In front of the vehicle are two objects, 114 and 115. FIG. 7 is that depicts a simplified top view of the example scenario with the lidar 113 and object 114 and object 115. FIG. 8 shows the simplified side view in which the road 116 is added. In FIG. 7, the diagram shows the measurements of LRF A 111 right in front of the vehicle, when it detects the road 116, object 114 and object 115. For each individual detection the signal strength and distance are measured and recorded. When the hub 113 has sufficiently rotated, LRF-112 will measure the same distances when it detects the road 116, object 114 and object 115. The signal strengths of the detected object can be utilized to decrease the false alarm rate and increase accuracy. A high resolution horizontal encoder records the horizontal angle of all LRF measurements. By means of the 180-degree horizontal angular location difference between the two LRFs, the vertical angle can be calculated using basic trigonometry. In FIG. 10, a schematic image explains the calculation of the vertical angle 119, based on the relative horizontal angle difference 118 between the LRFs of object 114, whereas 117 depicts the horizontal plane of a horizontal encoder.

In FIG. 11 the measurements of LRF-111 are compared with measurements from LRF-112, in the horizontal overlapping area 120 of both LRFs, based on the 30-degree angles of the laser beams relative to the vertical plane. This process can be expanded to any practical number of LRFs, where each LRF covers the full or a portion, overlapping to a certain extent, of the desired vertical angular range. The graphic image in FIG. 12 is depicting one measurement $A_{Tn}$ of LRF 111, being compared with six measurements $B_{Tn-3}$ through $B_{Tn+2}$ of LRF 112 in the horizontal overlapping area of the two LRFs, where both LRFs detect objects 114 and 115.

The areas C1 121 and C2 122 in the "Received Signal Strength" graphic image in FIG. 12 identify the identical measurements obtained at $A_{Tn}$, $B_{Tn-1}$, $B_{Tn}$ and $B_{Tn-1}$ from objects 114 and 115. C1 and C2 denote the same distances measured by LRF A 111 and LRF B 112.

Multiple range values at different locations on the object within C2 measurements $B_{Tn}$ and $B_{Tn+1}$ result in different vertical angles for the same object, allowing to determine the width and height of the object as well.

The Communications Systems of the Second Aspect of the Invention

The second aspect of the invention provides a light-based, preferably an infra-red (IR) light-based, communication system. The system can be used to communicate data at high data rates over short distances. The system comprises (1) a first structure comprising a light emitter, preferably an infrared (IR) emitter, (2) a second structure comprising a light detector which can detect light emitted by the light emitter, preferably an IR detector, the distance between the first and second structures being short enough to ensure that the light emitted by the emitter can be detected the detector, and (3) a hollow shaft or other component which connects the first and second structures, the emitter being at one end of the hollow shaft and the-detector being the other end of the hollow shaft, the hollow shaft or other component being such that data transmitted from the emitter to the detector is protected from environmental light interference.

In some embodiments, the data is transmitted by signals in the infrared wavelengths. In other embodiments, the data is transmitted in other wavelengths, for example visible, near infrared, or ultraviolet wavelengths, using appropriate transmitters and detectors.

In some embodiments, there is a single emitter which is part of the first structure (or two or more emitters in the same or different wavelengths) and a single detector which is part of the second structure (or two or more detectors for the wavelength or wavelengths emitted from the first structure). In other embodiments, the first structure comprises at least one emitter and at least one detector, and the second structure comprises at least one emitter and at least one detector.

In some embodiments, both the first structure and the second structure are stationary. In other embodiments, one of the first structure and the second structure is stationary and the other rotates. In other embodiments, both the first structure and the second structure rotate. If one of the structures rotates and the other is stationary, the emitter is preferably part of the rotating structure.

The distance between the first and second structures must be small enough that the light-based signals from the emitter are not so attenuated that they cannot be detected by the detector. The distance can for example be 0.04-12 inch, e.g. 0.5-8 inch or 0.7-6 inch.

The data rate used in the method of the invention can for example be 50-200 Mb/second, or even greater for example up to 1 Gb/second. When each of the first structure and the second structure comprises an appropriate emitter and detector, the data can be full-duplex transmission (i.e. transmission of data in two directions simultaneously).

The second aspect of the invention is illustrated in FIGS. 14-17 of the accompanying drawings, which are diagrammatic illustrations of an exemplary embodiment of the second aspect of the invention, and are not to scale.

FIG. 14 shows an exemplary IR light-based communication system to cover short distances with high data rates, from a stationary to a rotating structure. The system includes a stationary printed circuit board (PCB) 1 and a rotating PCB 2.

FIG. 15 shows a cross section of the communication system showing the stationary IR transmitter 3 and stationary IR receiver 4. Also shown in FIG. 15 are the rotating IR transmitter 5 and rotating IR receiver 6, as well as the environmental light interference protector shaft 7 that for example shields sunlight. Due to the nature of optical signal transmission and short distances, data rates of Gigabits are easily feasible. In similar systems, but not shown in the Figures, (1) multiple pairs of IR transmitter and receiver could be used to provide multi-channel, full-duplex and/or redundant communication, and/or
(2) the light-based communication system-could be integrated with a motor with a hollow rotor shaft which would provide environmental light protection.

The Induction Motors of the Third Aspect of the Invention

In the third aspect, this invention provides an assembly which comprises a multi-phase induction motor, preferably a three-phase induction motor, comprising (1) a wound rotor, and (2) a multi-phase rectifier, preferably a three-phase rectifier, which is mounted on the rotor. The assembly preferably comprises electronics, e.g. one or more printed circuit boards, which can be powered by DC output from the three-phase rectifier. The electronics can optionally be mounted on the rotor.

In a preferred embodiment, the third aspect of the invention provides a system which comprises a compact, electronics-controlled multi-phase induction motor with a wound rotor that provides electrical energy to electronic systems which can be integrated into the rotor assembly. The system can for example comprise a mounting base, drive electronics, a stator, an "out-runner" rotor with windings (wound-rotor) and multi-phase rectifier and a mechanical construction for assembly of an electronics system.

In one embodiment, the system comprises a compact stator whereby the three-phase AC is generated by an inverter, an "out-runner" rotor with windings, a three-phase rectifier connected to the rotor windings providing DC power to drive electronics components, printed circuit boards or other systems directly assembled to the rotor.

The third aspect of the invention is illustrated in FIGS. 16-18 of the accompanying drawings, which are diagrammatic illustrations of an exemplary embodiment of the third aspect of the invention, and are not to scale.

FIG. 16 is a perspective view of a compact three-phase induction motor that generates DC power on the rotor. The system includes a mounting base 111 and a rotor cover 112.

FIG. 17 is a perspective view of the motor shown in FIG. 16 with the mounting base 111 and rotor cover 112 removed. FIG. 17 shows a stator 113 (whose windings are not shown in the interests of clarity), an "out-runner" wound rotor 114, and a printed circuit board (PCB) comprising a rectifier 115.

The rotor windings 116 are connected to the PCB with rectifier 115 which is electronically controlled to provide a stable DC. In a similar embodiment, the rotor could turn inside the stator.

FIG. 18 shows the motor shown in FIG. 16 with the stator and rotor removed. In FIG. 18, drive electronics unit 117 converts DC (system input voltage) into a three-phase alternating current (AC) to drive each phase of the stator. A closed loop controller included in the drive electronics provides control of the speed and torque of the motor.

The following Statements provide further definitions of particular embodiments of the third aspect of the invention.

Statement #31.

A system comprising a compact multi-phase induction motor providing power to rotating components comprising:
  a drive electronics unit
  a stator
  a wound rotor and
  a rectifier built into the rotor.

Statement #31A.

A system according to Statement #31 which comprises one or more platforms or printed circuit boards with electronics systems directly assembled to the rotor and powered by the rectifier built into the rotor.

Statement #31B.

A system according to Statement #31 or Statement #31A which comprises an enclosure for environmental protection.

Statement #31C

A system according to Statement #31 or Statement #31A or Statement #31B which comprises a mechanical attachment containing DC system power input and data communication capabilities.

The invention claimed is:

1. A method comprising:
   rotating two or more laser beams around an axis of rotation, each of the laser beams having a wide dimension in a first plane and a relatively narrow dimension in a plane at right angles to the first plane, each of the laser beams having different orientations from each other, the wide dimension being 0.05-50° and the narrow dimension being 0.1-10.0 mrad, and there being an angular separation between the laser beams in the plane at right angles to the axis of rotation;
   tracking, by an encoder, a horizontal angle between the two laser beams based on the different orientations relative to an object; and
   calculating a vertical position of the object using the angular separation of the two laser beams.

2. A method according to claim 1 wherein the wide dimension of each of the laser beams is at an angle of 15-50° to a plane including the axis of rotation.

3. A method according to claim 1 wherein two laser beams rotate around a same axis of rotation, the angular separation between the two laser beams in the plane at right angles to the axis being 180°, the wide dimension of one of the laser beams being at a first angle of 15-50° on one side of the plane including the axis of rotation and the wide dimension of the other laser beam being at a second angle of 15-50° on an opposite side of the plane including the axis of rotation.

4. A method according to claim 3 wherein the first and second angles are the same, and each is 20-40°.

5. A method according to claim 3 wherein the laser beams rotate at a speed of 20-40 Hz.

6. The method of claim 1, wherein calculating the vertical position of the object using the angular separation of the two laser beams comprises calculating a horizontal angle difference based on the different orientations of each of the laser beams and calculating the vertical position of the object based on an intersection of detection of the object by the two laser beams relative to the horizontal angle.

7. An apparatus comprising:
   a rotatable hub;
   mounted to the rotatable hub, at least two laser beam sources, each of which laser sources, when operated, emits a laser beam having a wide dimension in a first plane and a relatively narrow dimension in a plane at right angles to the first plane, the wide dimension being 0.05-50° and the narrow dimension being 0.1-10.0 mrad, the laser beam of at least one of the at least two laser beam sources having a different orientation than another of the laser beam of at least an other one of the at least two laser beam sources, there being an angular separation between the laser beams generated by the at least two laser beam sources in the plane at right angles to an axis of rotation;
   an encoder configured to track a horizontal angle between the laser based on the different orientations relative to an object; and
   at least one processor configured to calculate a vertical position of the object using the angular separation of the two laser beams.

8. The apparatus of claim 7 further comprising:
   a communication system comprising:
   a first structure which rotates when the hub rotates and which comprises an infrared light emitter;
   a second structure which is fixed relative to the hub and comprises a light detector which can detect light emitted by the light emitter; and
   a hollow shaft which connects the first and second structures, the emitter being at one end of the apparatus and the detector being the other end of the apparatus, and protects light passing from the emitter to the detector from environmental light interference.

9. The apparatus of claim 7 further comprising:
   a three-phase induction motor which is mounted to the hub, the three-phase induction motor comprising:
   a wound rotor;
   a three-phase rectifier which is mounted on the rotor; and
   one or more printed circuit boards which are mounted on the rotor and can be powered by DC output from the rectifier.

10. The apparatus of claim 7, wherein the at least one processor configured to calculate the vertical position of the object using the angular separation of the two laser beams comprises the at least one processor configured to calculate a horizontal angel between the laser beams relative to the object comprises the encoder configured to calculate a horizontal angle difference based on the different orientations of each of the laser beams and calculating the vertical position of the object based on an intersection of detection of the object by the two laser beams relative to the horizontal angle.

* * * * *